United States Patent [19]
Lindell et al.

[11] Patent Number: 6,005,455
[45] Date of Patent: Dec. 21, 1999

[54] INTEGRATED FILTER

[75] Inventors: Patrik Lindell, Järfälla; Leif Kågström, Ekerö, both of Sweden

[73] Assignee: Telefonaktiebolaget LM Ericsson, Stockholm, Sweden

[21] Appl. No.: 08/872,394

[22] Filed: Jun. 10, 1997

[30]        Foreign Application Priority Data

Jun. 19, 1996  [SE]  Sweden ................................. 9602423

[51] Int. Cl.⁶ .............................. H01P 1/213; H01P 3/08; H01P 1/20
[52] U.S. Cl. .......................... 333/134; 333/203; 333/235
[58] Field of Search .................... 333/126, 129, 333/134, 136, 203–205, 235, 246

[56]            References Cited

U.S. PATENT DOCUMENTS

| | | | |
|---|---|---|---|
| 2,968,012 | 1/1961 | Alstadter | 333/205 |
| 3,305,802 | 2/1967 | Badger | 315/5.53 |
| 4,100,504 | 7/1978 | McGann | 331/39 |
| 5,281,934 | 1/1994 | Shiau et al. | 333/204 X |
| 5,521,561 | 5/1996 | Yrjola et al. | 333/103 |
| 5,581,217 | 12/1996 | Macdonald | 333/246 |
| 5,751,199 | 5/1998 | Shiau et al. | 333/203 X |

FOREIGN PATENT DOCUMENTS

| | | | |
|---|---|---|---|
| 0117676 A2 | 9/1984 | European Pat. Off. . | |
| 0552761 A1 | 7/1993 | European Pat. Off. . | |
| 3902998 | 8/1990 | Germany | 333/246 |
| 62-294302 | 12/1987 | Japan | 333/134 |

*Primary Examiner*—Seungsook Ham
*Attorney, Agent, or Firm*—Burns, Doane, Swecker & Mathis, L.L.P.

[57]            ABSTRACT

The present invention relates to an integrated radio unit used in radio base stations in mobile telephony. One housing is provided for all elements of an integrated radio unit, including a functional unit and a center conductor plate. The combination of the cover and base of the housing form protective cavities for the functional unit and, simultaneously, a cavity whose shape, in combination with the center conductor plate, helps form the filter characteristics of the integrated radio unit. The design of the housing reduces the need for extensive connections between elements and also provides a cavity which, in combination with the center conductor plate, will act as a filter.

21 Claims, 4 Drawing Sheets

INTEGRATED FILTER

FIELD OF THE INVENTION

The present invention relates generally to the use of HF-filters in base stations for mobile telephony, and more particularly to an integrated radio unit in such a base station incorporating such a filter.

RELATED ART

Many types of filters are used today in base stations for mobile telephony. Often these filters are formed from central conductors placed inside a cavity or number of cavities. The walls of this cavity or cavities are formed by the inner surface of a filter-casing. This filter is then connected by means of cables or other connectors to other functional units, such as printed circuit boards. This combination of elements is then placed in an outer casing which protects the filter and other units.

An example of a prior approach is in U.S. Pat. No. 4,100,504 to McGann. In this patent, the invention consists of a band rejection filter for a microwave transmission system composed of a series of cavity resonators. The resonators are formed from aluminum rods which are attached by screws to the housing which also forms the walls of the cavities. A printed circuit board containing some of the active elements of the circuit forms the upper end of each cavity. The impedance elements are attached to the opposite side of this printed circuit board. These are further connected to other printed circuit boards attached to the housing for the filter and printed circuit boards.

SUMMARY OF THE INVENTION

The present methods of making these filters present a number of problems. Because the filter requires a number of connections to other units, it takes more time to assemble the units with all the connections. All the extra cables and connections also present higher costs. If a method can be found to limit the number of connections between the filter and other units, by integrating them together, then assembly time would be reduced, space requirements would be reduced, and the cost would be reduced by the need for fewer connections.

While the approach in McGann represents an improvement over prior methods of integrating filters and the active electronic components, there is still substantial room for improvement by reducing connections and space requirements.

The present invention solves these problems by creating one housing for all elements of an integrated radio unit from only two pieces of metal, thereby reducing the number of stages of assembly required. The radio unit of the present invention contains four separate pieces, but is not limited to four, to be assembled: a center conductor plate, a housing in two pieces, and a functional unit, preferably a printed circuit board. Due to the design, it is now possible to integrate any printed circuit boards into this single unit using fewer connections than needed in the prior approaches. Significant space is also saved.

In one embodiment the present invention is designed to function as a transmitter bandpass filter to attenuate intermodulation products and reduce noise in the receiver band. The RF output from the integrated radio unit is fed into the transmitter antenna in a mobile telephony base station. The novel aspects of the invention, however, would also be useful in other types of filters, for example as a band rejection filter.

The present invention is an integrated radio unit in which the preferred embodiment is composed of four elements. The first element is a center conductor plate which contains a number of center conductors formed as a comb from one piece of metal. The center conductor plate is placed inside a cavity. The dimensions of the center conductor plate and of the cavity both serve to determine the filtering characteristics of the integrated radio unit. The center conductor plate is flat in profile, as distinguished from the cylindrically shaped filters in most prior approaches. It is formed from one piece of metal, either by die-casting or other techniques of metal shaping.

The next elements of the invention create a housing which is in two parts, an upper half constituting a cover and a lower half constituting a base. The cavity in which the center conductor plate is placed is formed by the inner surfaces of the cover and the base of this metal housing. The center conductor plate is attached to the base by screws or other common means of attachment.

The fourth element of the present invention is the functional element, which in the preferred embodiment includes active electronics in the form of printed circuit boards, PCBs. These PCBs are attached to the lower half of the housing constituting a base. These are also connected directly to the center conductor plate. In summary, the preferred embodiment of the present invention has only four separate parts that must be connected together, thereby saving on space and connections.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Figure 1:
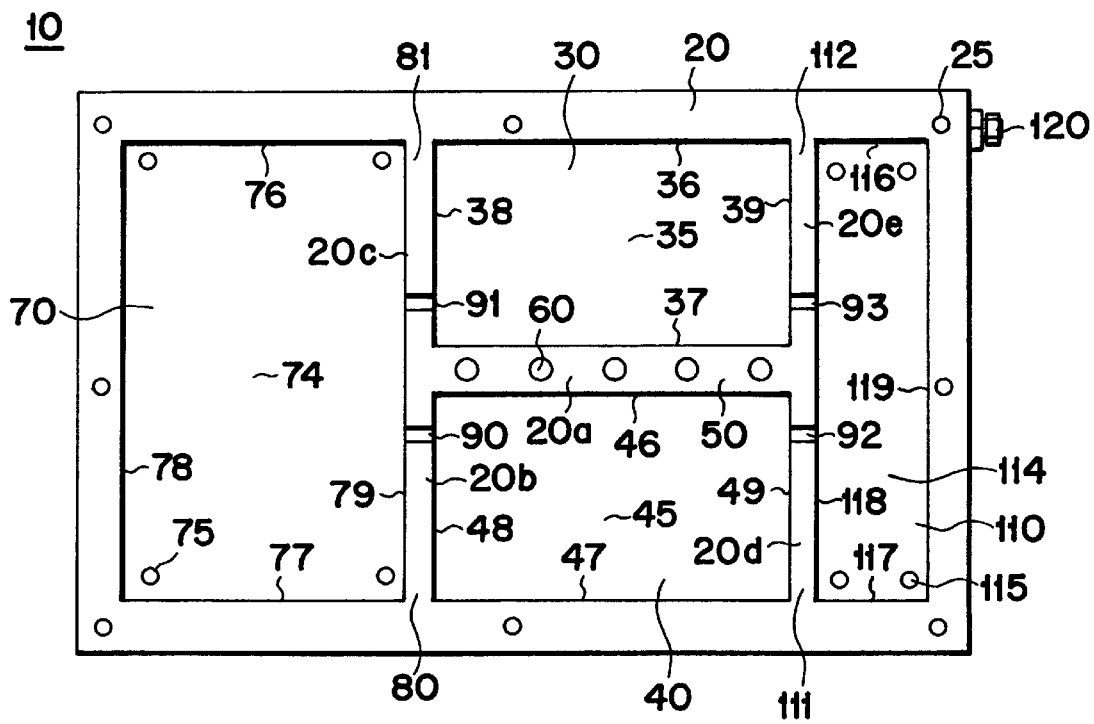
FIG. 1 shows a view of the base of the housing in the integrated radio unit of one embodiment of the present invention.

In FIG. 1 is shown a view of the integrated radio unit according to the present invention. Shown is the structure of the base 10 of the integrated radio unit. The base 10 is box-shaped which appears rectangular when viewed from the top. However, the external shape of the base is not limited to a box shape and may be shaped to whatever form may be required for placement in a mobile radio base station. The base 10 has an upper surface 20 which is stamped, milled or otherwise shaped using any of various metal-shaping techniques well known in the art. This shaping thereby forms a plurality of depressions, 30, 40, 70, and 110, in the upper surface 20. Also present on the upper surface 20 are a plurality of attachment points 25 in the form of, but not limited to, holes for screws to be used for mounting a cover to the base 10.

A first depression 30 is shown. It is rectangular-shaped and composed of a bottom surface 35 and four walls: an upper longitudinal wall 36, a lower longitudinal wall 37, a left transverse wall 38, and a right transverse wall 39. A second depression 40 is also shown. It is similarly composed of a bottom surface 45, and four walls: an upper longitudinal wall 46, a lower longitudinal wall 47, a left transverse wall 48, and a right transverse wall 49. A ridge 50 acts as a barrier between the first depression 30 and the second depression 40. It is composed of the lower longitudinal wall 37 of the first depression 30, the upper longitudinal wall 46 of the second depression 40 and a section of the upper surface 20 indicated by 20a. On the section 20a of the ridge 50 are located several attachment points 60 which are used to attach one or more center conductor plates to the ridge 50. In the preferred embodiment these attachment points 60 will be holes for screws which will be used to attach central conductors of a center conductor plate of the filter, however the present invention is not limited to this method of attachment.

A third depression 70 is also formed for the placement of a printed circuit board (PCB). The third depression has a bottom surface 74 and four walls: an upper longitudinal wall 76, a lower longitudinal wall 77, a left transverse wall 78, and a right transverse wall 79 which runs the whole length of the third depression from the upper longitudinal wall 76 to the lower longitudinal wall 77. Located on the bottom surface are a plurality of attachment points 75 which are used for attaching a PCB to the bottom surface 74. This method of attachment can be by any standard method of attachment known in the art.

Separating the third depression 70 and the second depression 40 is a second ridge 80. This second ridge 80 is formed from the left transverse wall 48 of the second depression 40, the right transverse wall 79 of the third depression 70 and a section of the upper surface 20 indicated by 20b. In this second ridge 80 is located a first terrace-formed channel 90. This first terrace-formed channel 90 serves as a pathway for a strip-line connection which will connect a PCB in the third depression 70 to a central conductor on the center conductor plate located in the second depression 40. Although the first channel 90 is terrace-formed in this embodiment, it is not necessarily so. Since various means of connecting the PCB to the center conductor plate are possible, the pathway created by the first terrace-formed channel 90 will be formed to best fit the means of connection used. In this particular embodiment the connection will be a flat strip-line connection on a protruding part of the PCB and will best fit into a channel which is terrace-formed.

Separating the third depression 70 from the first depression 30 is a third ridge 81 formed from the left transverse wall 38 of the first depression 30, the right transverse wall 79 of third depression 70, and a section of the upper surface 20 indicated by 20c. Located in this third ridge 81 is a second terrace-formed channel 91, similar to the first terrace-formed channel 90, to be used as a pathway for a second strip-line connection between the PCB placed in the third depression 70 and the center conductor plate located in the first depression 30. In the present embodiment only one PCB is placed in the third depression 70. In other embodiments other PCBs might be needed and added to the third depression 70.

A fourth depression 110 is shown to the right of the first depression 30 and the second depression 40, composed of a bottom surface 114 and four walls: an upper longitudinal wall 116, a lower longitudinal wall 117, a left transverse wall 118, and a right transverse wall 119. Both the left transverse wall 118 and the right transverse wall 119 span the length of the fourth depression from the upper longitudinal wall 116 to the lower longitudinal wall 117.

Two ridges, 111 and 112, are formed, and are named the fourth ridge 111 and the fifth ridge 112. These two ridges, 111 and 112, separate, respectively, the fourth depression 110 from the second depression 40 and the first depression 30. The fourth ridge 111 is formed by the left longitudinal wall 118 of the fourth depression 110, the right longitudinal wall 49 of the second depression 40, and a section of upper surface 20 indicated by 20d. The fifth ridge 112 is formed by the left longitudinal wall 118 of the fourth depression 110, the right longitudinal wall 39 of the first depression 30, and a section of the upper surface 20 indicated by 20e. Also present in this particular embodiment are a plurality of attachment points 115 used to attach a PCB to the bottom surface 114 by any standard method of attachment known in the art.

Two terrace-formed channels, 92 and 93, named, respectively, the third terrace-formed channel 92 and the fourth terrace-formed channel 93, are also located here. The third terrace-formed channel 92 is used as a pathway for a strip-line connection between the center conductor plate located in the second depression 40 and the PCB in located in depression 110. The fourth terrace-formed channel 93 is used as a pathway for a strip-line connection between the center conductor plate located in the first depression 30 and the PCB located in the fourth depression 110. The PCB to be placed in the fourth depression 110 will be connected to an antenna connector 120 which will send a filtered signal to a transmitting antenna.

Figure 2:
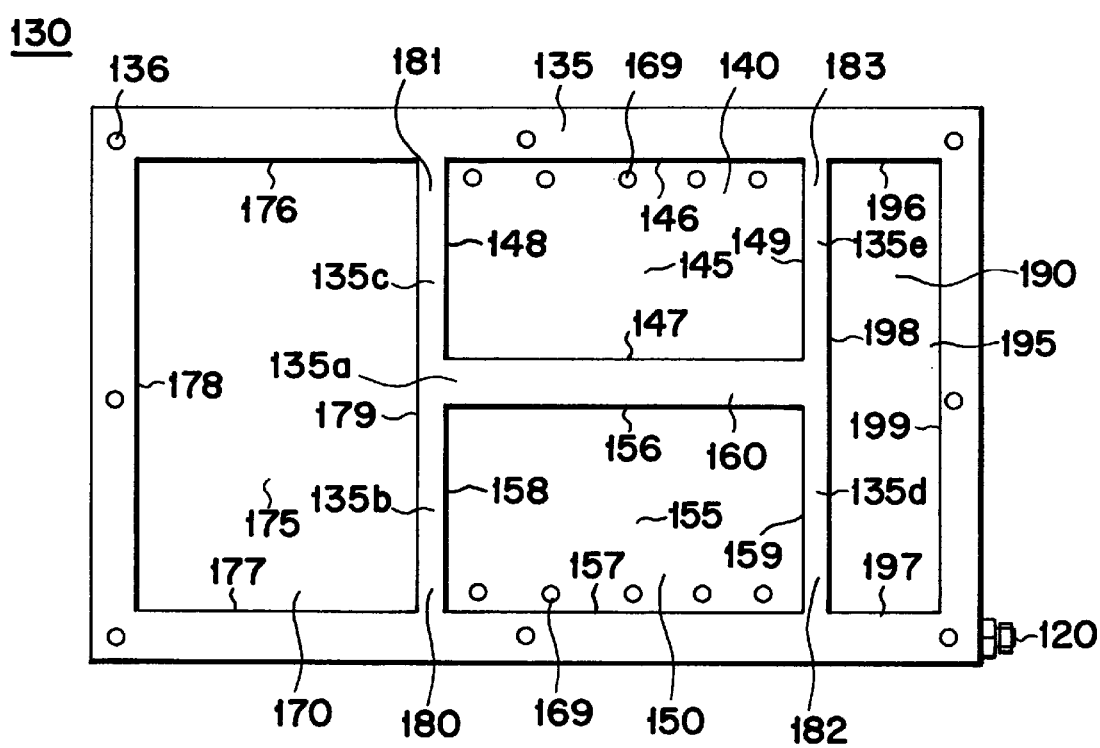
FIG. 2 shows a view of the cover of the housing in the integrated radio unit of one embodiment of the present invention.

FIG. 2 illustrates a cover 130 for the integrated radio unit of the present invention. It is formed from a similar piece of metal as the base 10 in FIG. 1. The cover 130 is box-shaped which is rectangular when viewed from the top. Like the base 10 in FIG. 1, the external shape and dimensions of the cover 130 are not crucial to the present invention and will be shaped and dimensioned to best fit into a mobile telecommunications system. The cover 130 also has an upper surface 135, like the upper surface 20 of the base 10, which is stamped, milled or otherwise shaped using any of a variety of metal-shaping techniques known in the art. This shaping forms a plurality of depressions in the upper surface 135. Attachment points 136 are also shown for mounting the cover 130 to the base 10. Attachment of the cover 130 to the base 10 will be done by screws in the preferred embodiment, but could be by any variety of methods known in the art.

A first depression 140 in the cover 130 is shown. It is rectangular shaped and composed of a bottom surface 145 and four walls: an upper longitudinal wall 146, a lower longitudinal wall 147, a left transverse wall 148, and a right transverse wall 149. A second depression 150 is also shown. It is similarly composed of a bottom surface 155 and four walls: an upper longitudinal wall 156, a lower longitudinal wall 157, a left transverse wall 158, and a right transverse wall 159. Both the first depression 140 and the second depression 150 have a plurality of holes 169 in their bottom surfaces, 145 and 155, which will be used for the placement of tuning screws which, in cooperation with center conductors of a center conductor plate, will be used to tune the filter as explained later.

A first ridge 160 acts as a barrier between the first depression 140 and the second depression 150. It is created by the shaping of the first depression 140 and the second depression 150. It is composed of the lower longitudinal wall 147 of the first depression 140, the upper longitudinal wall 156 of the second depression 150, and a section of the upper surface 135 indicated by 135a. Unlike the first ridge 50 of the base 10, the first ridge 160 of the cover 130 does not have the need for attachment points (e.g. the attachment points 60 of the base 10 in FIG. 1) to attach the center conductor plate.

A third depression 170 is also formed to act as a cover for the later placement of the one or two PCBs placed in the third depression 70 of the base 10. The third depression 170 of the cover 130 has a lower surface 175 and four walls: an upper longitudinal wall 176, a lower longitudinal wall 177, a left transverse wall 178, and a right transverse wall 179.

The right transverse wall 179 forms two ridges, 180 and 181, named, respectively, the second ridge 180 and the third ridge 181. These two ridges, the second ridge 180 and the third ridge 181, separate, respectively, the third depression 170 from both the second depression 150 and the first depression 140. The second ridge 180 is formed from the left transverse wall 158 of the second depression 150, the right transverse wall 179 of the third depression 170, and a section of the upper surface 135 indicated by 135b. The third ridge 181 is similarly formed from the left transverse wall 148 of the first depression 140, the right transverse wall 179 of the third depression 170, and a section of the upper surface 135 indicated by 135c.

A fourth depression 190 is also shown. It is similar to the third depression 170 and likewise has a bottom surface 195 and four walls: an upper longitudinal wall 196, a lower longitudinal wall 197, a left transverse wall 198 and a right transverse wall 199. The left transverse wall 198 creates two ridges, 182 and 183, named, respectively, the fourth ridge 182 and the fifth ridge 183. These two ridges, fourth ridge 182 and fifth ridge 183, separate, respectively, the fourth depression 190 from both the second depression 150 and the first depression 140. The fourth ridge 182 is formed from the right transverse wall 159 of the second depression 150, the left transverse wall 198 of the fourth depression 190, and a section of the upper surface 135 indicated by 135d. The fifth ridge 183 is similarly formed from the right transverse wall 149 of the first depression 140, the left transverse wall 198 of the fourth depression, and a section of upper surface 135 indicated by 135e. The fourth depression 190 acts as a cover for the PCB which will be attached in the fourth depression 110 of the base 10.

The ridges, 50, 80, 81, 111, and 112, in the base 10 of FIG. 1, correspond with the corresponding ridges, 160, 181, 180, 183, and 182, to be found in the cover 130 of FIG. 2. The first ridge 50 in the base 10 corresponds with the first ridge 160 in the cover 130. Likewise, the second ridge 80 in the base 10 corresponds with the third ridge 181 in the cover 130, the third ridge 81 in the base 10 with the second ridge 180 in the cover 130, the fourth ridge 111 in the base 10 with the fifth ridge 183 in the cover 130, and the fifth ridge 112 in the base 10 with the fourth ridge 182 in the cover 130.

When the cover 130 is attached to the base 10, two resonating cavities, not directly indicated in this figure, are created by the correspondence of the various ridges indicated above. When the cover 130 is attached to the base 10, the corresponding ridges, 50–160, 80–181, 81–180, 111–183, and 112–182, are located in such physical proximity to each other as to be touching. This contact then creates sealed cavities in accordance with the present invention which can act as resonating cavities for the center conductor plate which will be placed in the cavities. It is the combination of these cavities with the center conductor plate that forms the filter of the integrated radio unit. The signal to be filtered is passed through the center conductor plate. The combination of the size and shape of the cavities along with the physical qualities of the center conductor plate determine the filter characteristic of the filter.

The ridges 50, 81, and 112, of the base 10, will come into contact with their corresponding ridges, 160, 180, and 182, in the cover 130. Their correspondence will create a first resonating cavity, not directly shown in this figure, consisting of the space occupied by the first depression 30 in the base 10 and the corresponding second depression 150 in the cover 130. This first resonating cavity's inner surface will consist of the following: the upper longitudinal wall 36, the lower longitudinal wall 37, the left transverse wall 38, and the right transverse wall 39 of the first depression 30 of the base 10; the upper longitudinal wall 156, the lower longitudinal wall 157, the left transverse wall 158, and the right transverse wall 159 of the second depression 150 of the cover 130; the bottom surface 35 of the first depression 30 of the base 10, and the bottom surface 155 of the second depression 150 of the cover.

Likewise, ridges 50, 80, and 111, of the base 10, will come into contact with their corresponding ridges, 160, 181, and 183, in the cover 130. Their pairing will create a second resonating cavity, not directly shown in this figure, consisting of the space occupied by the second depression 40 in the base 10 and the corresponding first depression 140 in the cover 130. This second resonating cavity's inner surface will consist of the following: the upper longitudinal wall 46, the lower longitudinal wall 47, the left transverse wall 48, and the right transverse wall 49 of the second depression 40 in the base 10; the upper longitudinal wall 146, the lower longitudinal wall 147, the left transverse wall 148, and the right transverse wall 149 of the first depression 140 in the cover 130; the bottom surface 45 of the second depression 40 of the base 10, and the bottom surface 145 of the first depression 140 of the cover 130.

These cavities form an integral part of the integrated filter in the radio unit of the present invention. By creating resonating cavities from this correspondence of a cover 130 with a base 10, the same cover 130 and base 10 can also act as a housing for the other elements of an integrated radio unit. By having all elements of the radio unit protected by the same housing, connections needed between the various elements are minimized. Although great care is needed to match the elements of the cavities located in the cover 130 with the elements of the cavities located in the base 10, the sizes and shapes of the various surfaces of the cavities are, in themselves, well-known in the art. They are not limited to the flat surfaces and edges meeting at right angles indicated in the present figures, which have been done merely for the ease of illustration.

Although the present embodiment shows an integrated radio unit with two cavities to house a center conductor plate with an upper strip and a lower strip, the present invention could as easily accommodate other center conductor plates which might require only one upper or lower strip on the center conductor plate, or perhaps more than one upper or lower strip on the center conductor plate.

Figure 3:
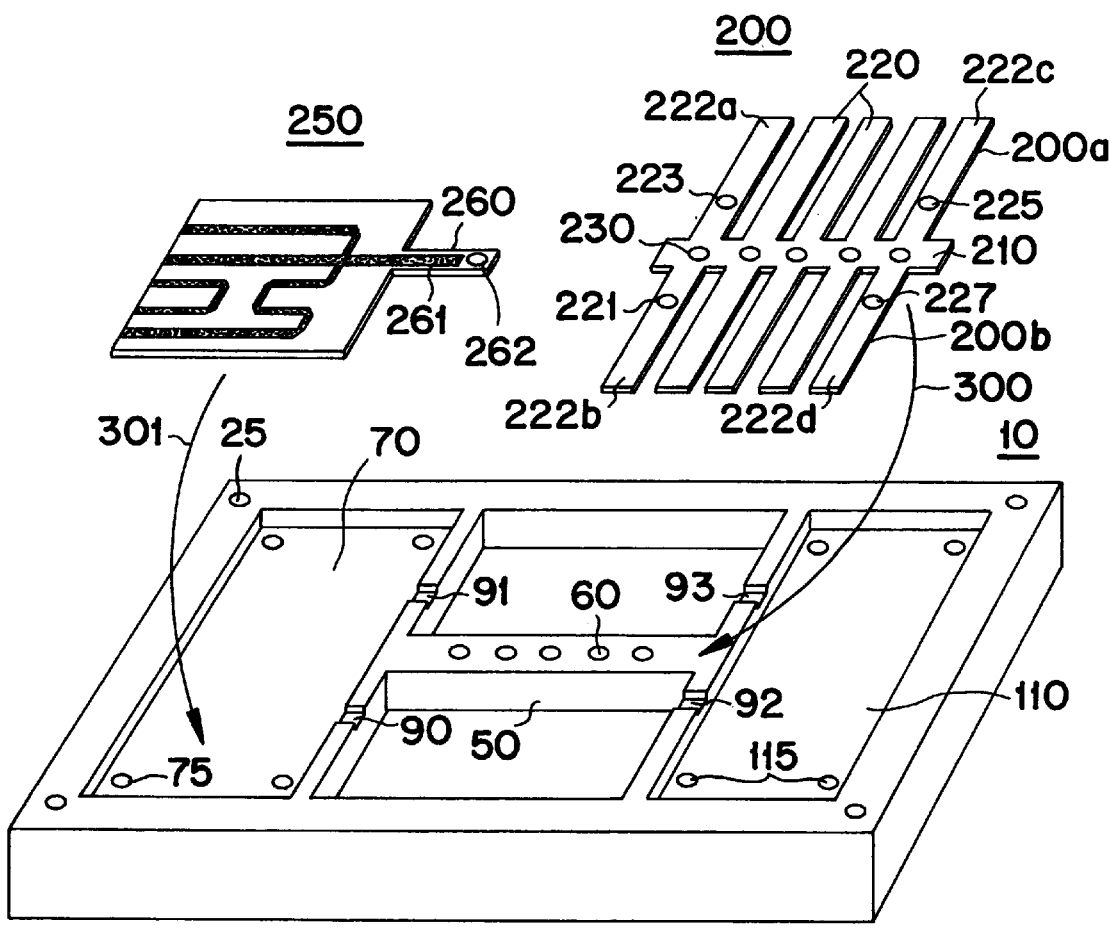
FIG. 3 shows a perspective view illustrating the relationship of different elements of the present invention, including the base, center conductor plate and PCB, which will be inserted into the integrated radio unit of one embodiment of the present invention.

In FIG. 3 is seen an exploded view of one embodiment of the integrated radio unit according to present invention and how the center conductor plate and the PCB are to be mounted on the base 10. The base 10 shown in FIG. 1 is seen in a three-dimensional view here. All the elements of the base 10 as shown in FIG. 1 are seen here, albeit in a different view. Here will be discussed additional aspects of this embodiment not present in FIG. 1.

First shown is the center conductor plate 200 of the filter in the integrated radio unit. The center conductor plate 200 is shaped like a comb, with a base 210 and a plurality of center conductors 220 extending perpendicularly from the base 210 in a manner known per se in the art. The center conductors 220 are placed adjacent to one another, with a gap between each of them. There are also several attachment points 230 which are used to attach the center conductor plate 200 to the base 10 at attachment points 60 on the ridge 50. In the preferred embodiment these attachment points will be holes for screws, but any other standard attachment method known in the art may be used.

Each of the central conductors 220 has a rectangular shape when viewed from the front in this particular embodiment, although other shapes are possible and well-known in the art. The shape of the central conductors 220 is one of the determining factors of the filtering characteristics of the center conductor plate 200. The filtering characteristics are also determined in part by the length of the central conductors 220, their mass, the number of central conductors 220, and their placement relative to each other. These factors determining the filtering characteristics are well known in the art. The center conductor plate 200 in this embodiment is made from metal by stamping out the shape from one piece of metal, although it could be formed by die-casting or other methods of metalwork known in the art.

FIG. 3 illustrates an embodiment of the present invention wherein the center conductor plate 200 has an upper strip 200a consisting of the five center conductors 220 on the upper half of the center conductor plate 200 and a lower strip 200b consisting of the five center conductors 220 on the lower half of the center conductor plate 200. The upper strip 200a and the lower strip 200b act as two separate independent filters. Each will be located in the first and second resonating cavities, respectively, which were discussed previously. Each strip, 200a or 200b, can have different shapes and sizes, resulting in different filtering characteristics. They can then be independently combined with different PCBs, or other functional units, to perform different filtering functions required by the filter.

In FIG. 3 is also shown a PCB 250 which is to be attached to the base 10 in the third depression 70. The PCB 250 shown is a standard PCB, but could have a variety of functionalities designed into it depending on the purpose of the filter. Protruding from the PCB 250 is a protruding section 260. At the tip of the protruding section 260 is located a hole 262 for a screw which will be used to attach the PCB 250 to the center conductor plate 200. Located on the surface of this protruding section 260 is a strip-line connection 261. This protruding section 260 is dimensioned so as to fit into the first terrace-formed channel 90, see also FIG. 1, and is used to attach the PCB 250 to the lower strip 200b of the center conductor plate 200. The protruding part 260 of the PCB 250 is attached to the left-most central conductor 222b of the lower strip 200b at the attachment point 221 shown. The attachment can be made by any of a variety of methods known in the art.

The assembly of the present embodiment of the integrated radio unit is much simpler when compared to the assembly needed for prior radio units in the art. The center conductor plate 200 will be attached, as indicated by the first arrow 300, by connecting the attachment points 230 to the ridge 50 of the base 10 at its attachment points 60. As discussed previously, the method of attachment in the preferred embodiment is by screws, but the present invention does not limit the method of attachment. The PCB 250 will be placed, as shown by the second arrow 301, in the third depression 70 and attached at the attachment points 75. The PCs 250 will also be attached by a screw through its hole 262 to the center conductor plate 200 by connecting the protruding part 260 to the left-most central conductor 222b of the lower strip 200b at its attachment point 221, thereby creating a contact between the strip-line connection 261 and the lower strip 200b of the center conductor plate 200. A second PCB, not shown, for the present embodiment might also be placed into the third depression 70 to be attached to the center conductor plate 200 by connecting a protruding part of the second PCB to an attachment point 223 on the leftmost central conductor 222a of the upper strip 200a. However, in the present, preferred, embodiment, only one PCB will be placed in the third depression 70. It will have a second protruding part, not shown, analogous to the protruding part 260 shown in FIG. 3. This will also have an analogous strip-line connection which will be used to connect the PCB to the upper strip 200a of the center conductor plate 200.

A third PCB, also not shown in this figure, will be placed in the fourth depression 110 and attached to the attachment points 115 in the fourth depression 110. This third PCB will have two protruding parts, similar to the protruding part 260 on the first PCB 250, which will each have a strip-line connection, placed into the two terrace-formed channels, 92 and 93. These two protruding parts will be used to connect this third PCB to the center conductor plate 200 on both the upper strip 200a at its attachment point 225 on the right-most central conductor 222c and the lower strip 200b at its attachment point 227 on its right-most central conductor 222d. In the final step of assembly of the radio unit, the cover 130 of FIG. 2, not shown here, will be attached to the base 10 at the attachment points 25. Attaching the cover 130 to the base 10 will simultaneously form a protective housing for the PCB 250 and other PCBs not shown, and at the same time create resonating cavities for the filter.

Figure 4:
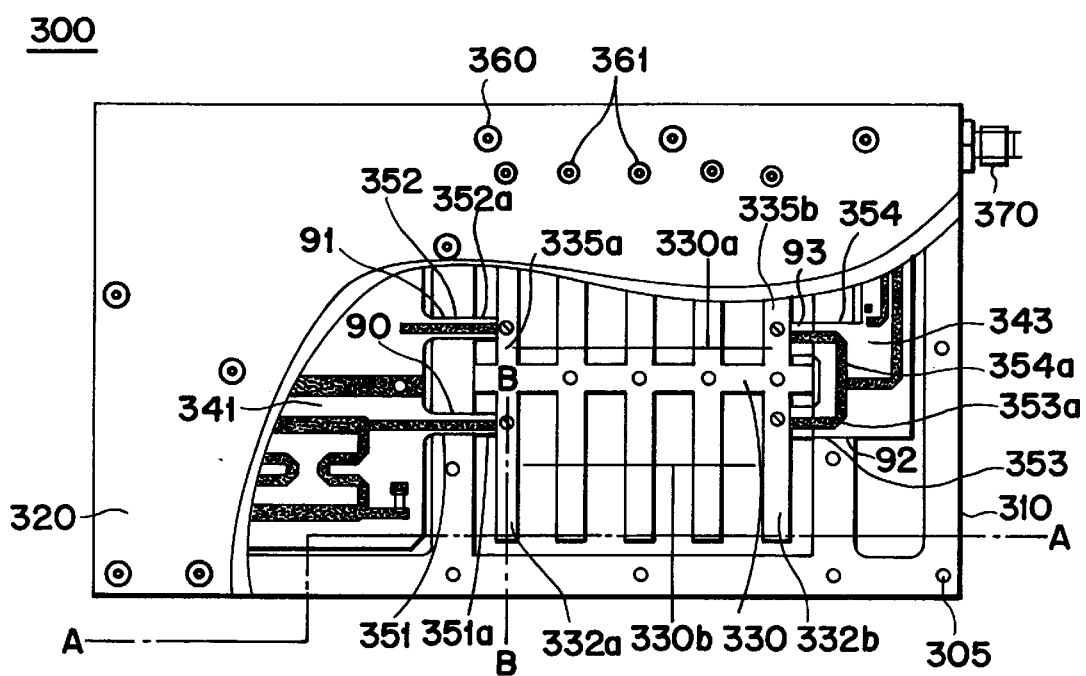
FIG. 4 shows a side view of the different elements of one embodiment of the present invention, as mounted according to FIG. 3.

In FIG. 4 is seen a view of one embodiment of the present invention. The integrated radio unit 300 is here shown assembled in a cutaway view. This integrated radio unit 300 is essentially composed of only four elements, although, as indicated previously, the present invention is not limited to only four elements. The first element is the base 310. This corresponds to the same structure as the base 10 shown in FIG. 1 and in FIG. 3. The second element is a cover 320 which corresponds to the cover 130 shown in FIG. 2. In FIG. 4 it is seen how the cover 320 is attached to the base 310 at several attachment points 305. The attaching is done by mounting screws 360, but any other method of attachment known in the art may be used.

The third element of the integrated radio unit 300 is the center conductor plate 330. This corresponds to the structure of the center conductor plate 200 of FIG. 3. The center conductor plate 330 in the embodiment shown in FIG. 4 also has an upper strip 330a of central conductors and a lower strip 330b forming a second row of central conductors of corresponding shape and size to the upper strip 200a and lower strip 200b of FIG. 3. In general, the central conductors 332 of both the upper strip 330a and the lower strip 330b may be formed from one piece of material as illustrated in both FIG. 3 and FIG. 4. The center conductor plate 330, together with the cavities described above, forms the integrated filter which, together with the functional units described below, forms the integrated radio unit of the present invention.

Two functional units in the form of PCBs 341 and 343, are shown on both the left side and right side of the center conductor plate 330. First PCB 341 is shown connected to the left-most central conductor 332a of the lower strip 330b. It is connected by a strip-line connection 351a, corresponding to the strip-line connection 261 shown in FIG. 3, which is placed on a protruding part 351, corresponding to the protruding part 260 shown in FIG. 3, set in a first terrace-formed channel 90, corresponding to the first terrace-formed channel 90 of FIG. 3. The first PCB 341 is also shown connected to the left-most central conductor 335a of the upper strip 330a. It is connected by a strip-line connection 352a which is provided on a protruding part 352 placed in a second terrace-formed channel 91, corresponding to the second terrace-formed channel 91 of FIG. 3.

Second PCB 343 is shown connected to the right-most central conductor 332b of the lower strip 330b and the right-most central conductor 335b of the upper strip 330a. It is connected by a first strip-line connection 353a which is placed on a protruding part 353 set in a third terrace-formed channel 92, corresponding to the third terrace-formed channel 92 of FIG. 3. It is also connected by a second strip-line connection 354a which is provided on a protruding part 354 placed in a fourth terrace-formed channel 93, corresponding to fourth terrace-formed channel 93 of FIG. 3.

The first PCB 341 in this integrated radio unit 300 embodiment of the present invention functions as a Hybrid Combiner ("H-Combiner"). The first PCB 341 in the integrated radio unit 300 embodiment of the present invention is also designed to function as a Low Noise Amplifier ("LNA"). The second PCB 343 in the integrated radio unit 300 embodiment of the present invention functions to couple the integrated filter to a transmitting and/or receiving antenna. The present invention does not limit the number of PCBs that can be used to suit a variety of applications for different filters. Although the connections between the PCBs, 341 and 343, and the center conductor plate, 332a, 352a, 353a and 354a are formed from strip-line connections, other, more conventional, connections can also be used between the PCBs and the center conductor plate 330. These could include screws, soldering, gluing or other fastening means or operations.

As shown in the present embodiment, a signal to be filtered enters the upper strip 330a from the first PCB 341 via a strip-line connection 352a at the left-most central conductor 335a, is filtered according to the filtering properties of the upper strip 330a, and exits from the right-most central conductor 335b via a strip-line connection 354a into the PCB 343 on the right side. Similarly, a second signal to be filtered enters the lower strip 330b from the first PCB 341 via a strip-line connection 351a at the left-most central conductor 332a, is filtered according to the filtering properties of the lower strip 330b, and exits from the right-most central conductor 332b via a strip-line connection 353a into the PCB 343 on the right side. Both the first signal and the second signal will then be sent from the third PCB 343 through the antenna connector 370 to a transmission antenna. Also shown in FIG. 4 are tuning screws 361, which are used, in cooperation with the center conductor plate 330, to finely tune the filter characteristics of the integrated filter of the radio unit.

Figure 5:
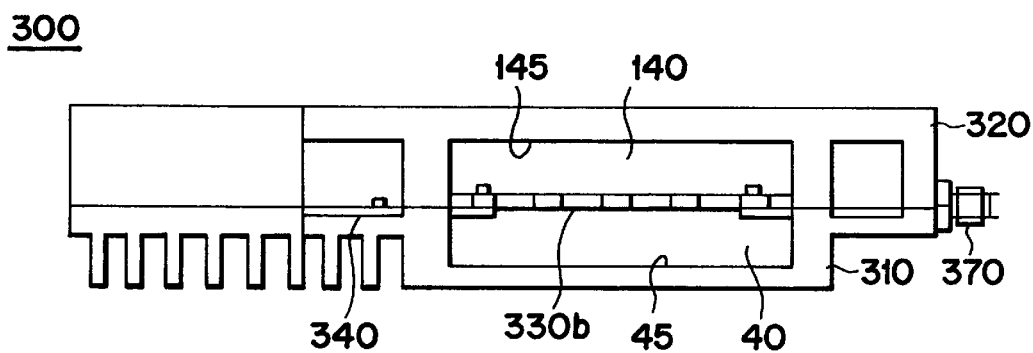
FIG. 5 shows a top view illustrating the relationship of the various elements of the invention, along the line A—A indicated in FIG. 4.

FIG. 5 shows another view of the integrated radio unit 300 embodiment of the present invention. This end-view is generated by cutting the integrated radio unit 300 along the line A—A indicated in FIG. 4. This end-view shows the base 310 and cover 320. More clearly shown in this figure is the second resonating cavity of the integrated filter formed by the arrangement of the base 310 and cover 320. This second resonating cavity is formed as a combination of both space occupied by the second depression 40 in the base 310 and the first depression 140 in the cover 320, corresponding to the second depression 40 in FIG. 1 and the first depression 140 in FIG. 2, respectively. The size and shape of this second resonating cavity, in combination with of the lower strip 330b of the center conductor plate 330, also affect the filter characteristic of the integrated filter. Located immediately behind this cavity is a first resonating cavity, not visible in this view, formed from the first depression 30 in the base 10 of FIG. 1 and the second depression 150 in the cover 130 of FIG. 2. The size and shape of this first resonating cavity similarly affect the filter characteristic. However, due to the design of the present embodiment, wherein the first and second resonating cavities are separated by ridge 50 of the base 10 in FIG. 1 and ridge 160 of the cover 130 in FIG. 2, the influence on the filter characteristic due to the upper strip 330a and the lower strip 330b are independent of each other. This allows very different functions to be carried out, depending on the characteristics of the resonating cavities, the different strips of the center conductor plate 330, and the functions built into the PCBs.

The lower strip 330b of the center conductor plate 330 is placed approximately half the distance between the bottom surface 45 of the second depression 40 in the base 310 and the bottom surface 145 of the first depression 140 in the cover 320. The second resonating cavity formed by the combination of the second depression 40 in the base 310 and the first depression 140 in the cover 320 can be filled with air, as in the present embodiment, or with other isolating materials such as ceramic. Different materials may be used to affect the filtering characteristics in different ways. The variety and filtering affects of these materials are well known in the art.

The flat profile of the lower strip 330b of the center conductor plate 330 is also indicated in the view of FIG. 5. Located directly behind the lower strip 330b, but not visible in this view, is the upper strip 330a, which is similarly placed approximately half the distance between the bottom surface 35 of the first depression in the base 10 of FIG. 1 and the bottom surface 155 of the second depression 150 in the cover 130 of FIG. 2. The way in which these surfaces are paired to form a first resonating cavity has been discussed previously.

Figure 6:
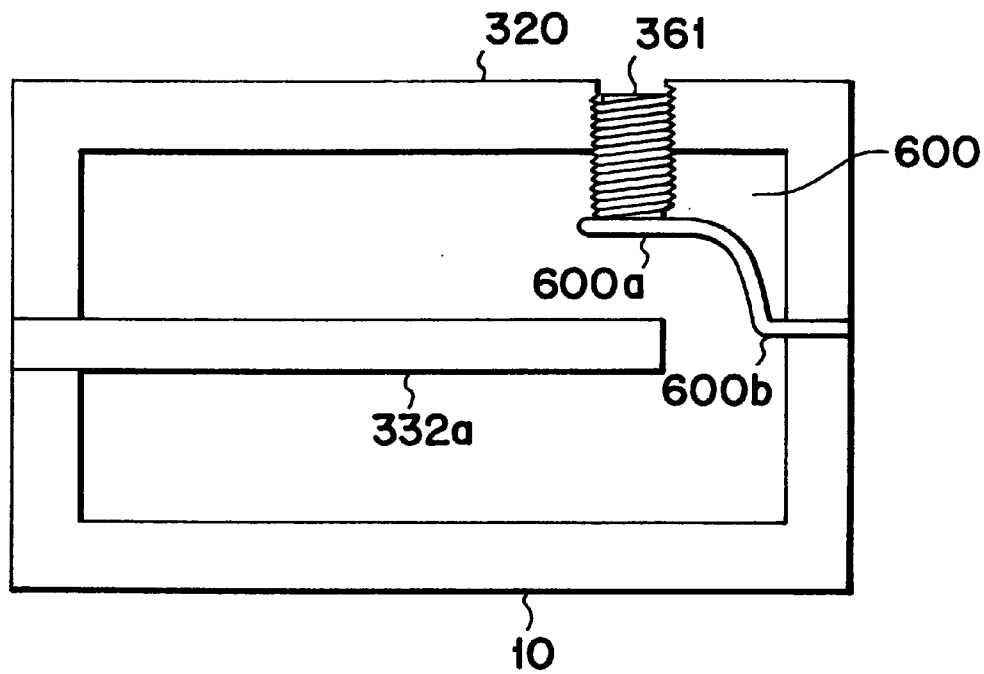
FIG. 6 shows a side view along the line B—B in FIG. 4 illustrating one embodiment of the present invention, wherein a spring-metal strip is used to restrict the movement of a tuning screw.

In FIG. 6 is seen another view of one embodiment of the radio unit of the present invention. This side-view is generated by cutting the integrated radio unit 300 along the line B—B indicated in FIG. 4. Shown in this view are the cover 320, the base 10, the left-most center conductor 332a of the lower strip 330b of the center conductor plate of FIG. 4, and a tuning screw 361. In most embodiments the tuning screw 361 would be an ordinary screw capable of conducting electricity. The tuning screw 361 would be rotated inward toward the center conductor 332a or outward away from the center conductor 332a. The capacitance set up between the tuning screw 361 and the center conductor 332a affects the filter characteristic in combination with the center conductor in ways which are known in the art.

In prior methods of tuning, the tuning screw was locked into place with a locking nut to prevent the screw from accidentally rotating which would thereby adversely affect the setting of the tuning. What is new in the preferred embodiment in comparison with prior tuning methods is the spring metal arm 600. This spring metal arm 600 is a metal strip which can either be electrically conducting or electrically insulated. In addition, it is possible for both the spring metal arm 600 and the tuning screw 361 to be electrically conducting. In the embodiment shown, the spring metal arm 600 is electrically insulating. The spring metal arm 600 has an upper arm 600a and a lower arm 600b. The lower arm 600b is attached, by any of a variety of methods known in the art, to the base 10.

The upper arm 600a extends in an upward arc away from the lower arm 600b, as shown. When the tuning screw 361 is screwed into the cavity it will come into contact with the upper arm 600a. The upper arm 600a will then exert an upward pressure on the tuning screw 361 which will prevent it from accidentally rotating from its set position once tuning has been done. While the spring metal arm 600 is electrically insulated in the embodiment shown in FIG. 6, the tuning screw is electrically conducting, by coating it with a coating of silver or other electrically conducting material. The tuning effects from the tuning screw 361 will be due to the capacitance set up between the tuning screw 361 and the center conductor 332a. In some embodiments the spring metal arm 600 may be electrically conducting while the tuning screw 361 will then be insulated, or at least separated from the spring metal arm by an insulating plate. The tuning effects will then arise from the capacitance set up between the spring metal arm 600 and the center conductor 332a. In those embodiments where both the spring metal arm 600 and the tuning screw 361 are electrically conducting the tuning effects will arise from the capacitance set up between the center conductor 332a and both the spring metal arm 600 and the tuning screw 361; there may or may not be an insulating pad located between the spring metal arm 600 and the tuning screw 361.

Figure 7:
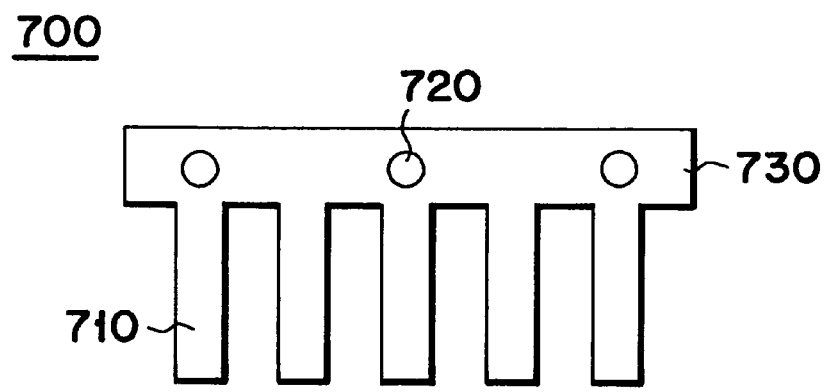
FIG. 7 shows a top view illustrating a row of spring-metal strips like the one shown in FIG. 6.

FIG. 7 shows a spring metal plate 700 which has a plurality of spring metal arms 710 extending perpendicularly from a base 730. The spring metal plate 700 has a plurality of attachment points 720 which will be used to attach it to the base 10. Each of the spring metal arms 710 have a one-to-one correspondence to each of the tuning screws present which also have a one-to-one correspondence to each of the center conductors present. For example, the lower strip 330b in FIG. 4 has five center conductors. There will be five matching tuning screws 361 in the cover 320 corresponding to the five matching spring metal arms 600 on the spring metal plate 700. There will also be a second spring metal plate 700 provided for the upper strip 330a in FIG. 4.

In summary, the present invention is designed to be installed as a unit in a base station for mobile communications. When installed into a base station, an outgoing signal to be filtered enters the PCB 341 of the integrated radio unit as shown in FIG. 4. The signal is processed in an H-combiner formed in the PCB 341 and is sent to the upper part of the integrated filter, upper strip 330a of the center conductor plate 330, via the strip-line connection 352a. The signal is filtered by the upper strip 330a and its associated cavity. The outgoing signal is thereafter passed, via the strip-line connection 354a, through measuring couplers formed by the second PCB 343, and finally sent through the antenna connector 370 to the transmitting antenna of the base station.

An incoming signal from the receiving antenna of the base station enters the antenna connector 370 where it is sent to the second PCB 343. It is then sent, via the strip-line connection 353a, to the lower part of the integrated filter, lower strip 330b of the center conductor plate 330. The combination of the lower strip 330b and its associated cavity filter the signal and then supply it via the strip-line connection 351a to a low noise amplifier formed in the first PCB 341. The signal is then sent to be processed in the receiver of the base station. Although the above summary describes an embodiment wherein there is both a transmitted signal operated on by an H-combiner and a received signal operated on by a low-noise amplifier, the present invention is not limited to these types of functional units.

This method for combining the various elements in an integrated radio unit to be used in a base station for mobile communications that has been described is novel and represents an advance over prior approaches to the problem of limiting the space and connections needed when integrating the various functional parts of a filter. The design of the present invention allows one housing to serve as both a resonating cavity for the center conductor plate of the filter and a protective cover for all the functional elements, such as PCBs, of the radio unit. By limiting the essential elements needed in the integrated radio unit, the number of connections, and therefore the cost and assembly time have been reduced.

The embodiment described serves as illustration and not as limitation. It will be apparent to one of ordinary skill in the art that departures may be made from the embodiment described above without departing form the spirit and scope of the invention. Therefore, the invention should not be regarded as being limited to the examples described, but should be regarded instead as being equal in scope to the following claims.

What is claimed is:

1. An integrated radio unit comprising:
   a base and a cover to house at least one functional unit and at least one filter unit wherein said at least one filter unit consists of a cavity and a center conductor plate, said cavity being formed by a combination of said base and said cover and the center conductor plate being situated within said cavity, and said combination simultaneously forming a protective housing for said at least one functional unit wherein further said at least one filter unit has a tuning device comprising; at least one electrically conducting tuning screw inserted through said cover of said integrated radio unit and into said cavity; and a spring metal plate consisting of at least one electrically insulated spring metal arm, extending into said cavity to contact said at least one tuning screw, said at least one filter unit being tuned by rotating said at least one tuning screw in said cavity to set up an electrical capacitance between said at least one tuning screw and said center conductor plate, the contact between said at least one tuning screw and said at least one spring metal arm locking said at least one tuning screw into a set position.

2. The integrated radio unit of claim 1, wherein:
   said cavity comprises an upper cavity and a lower cavity, said center conductor plate comprises an upper strip and a lower strip, the upper cavity and the upper strip forming a first filter unit and the and the lower strip forming a second filter unit.

3. The integrated radio unit of claim 2, wherein said base has a ridge and said cover has a ridge, said center conductor plate being attached to said ridge of said base, and wherein further said ridge of said cover and said ridge of said base form a separation between said upper cavity and said lower cavity.

4. The integrated radio unit of claim 1, wherein said base has a plurality of ridges and said cover has a plurality of ridges, wherein said ridges of said cover are matched to said ridges of said base to form a plurality of depressions, said depressions creating a plurality of cavities to house, in combination, said at least one functional unit, and said ridges creating a separation between said plurality of cavities and said cavity of said filter unit.

5. The integrated radio unit of claim 4, wherein said ridges separating said cavities housing said at least one functional unit and said cavity of said filter unit contain at least one pathway for connections between said at least one functional unit and said at least one filter unit.

6. The integrated radio unit of claim 5, wherein said at least one pathway is a terrace-formed channel for housing strip-line connections.

7. The integrated radio unit of claim 1, wherein said cavity is filled with an isolating material.

8. The integrated radio unit of claim 1, wherein said at least one functional unit consists of at least one printed circuit board (PCB).

9. The integrated radio unit of claim 8, wherein said at least one PCB consists of two PCBs that are divided by function into at least one input PCB and at least one output PCB.

10. The integrated radio unit of claim 9, wherein said at least one input PCB is a low noise amplifier.

11. The integrated radio unit of claim 9, wherein said at least one input PCB is a Hybrid-combiner.

12. The integrated radio unit of claim 9, wherein said at least one output PCB is a measuring coupler.

13. The integrated radio unit of claim 5, wherein said center conductor plate is connected to said at least one functional unit by a connection through at least one of said plurality of pathways for connections.

14. The integrated radio unit of claim 13, wherein said connection is by means of a strip-line connection.

15. The integrated radio unit of claim 13, wherein said connection is by means of screws.

16. The integrated radio unit of claim 13, wherein said connection is by means of soldering.

17. The integrated radio unit of claim 13, wherein said connection is by means of glue.

18. The integrated radio unit of claim 13, wherein said connection is by means of cables.

19. An integrated radio unit comprising:

a base and a cover to house at least one functional unit and at least one filter unit wherein said at least one filter unit consists of a cavity and a center conductor plate, said cavity being formed by a combination of said base and said cover and the center conductor plate being situated within said cavity, and said combination simultaneously forming a protective housing for said at least one functional unit wherein further said at least one filter unit has a tuning device comprising at least one electrically insulated tuning screw inserted through said cover of said integrated radio unit and into said cavity; and a spring metal plate consisting of at least one electrically conducting spring metal arm extending into said cavity to contact said at least one tuning screw, said at least one filter unit being tuned by rotating said at least one tuning screw in said cavity for setting up an electrical capacitance between said at least one spring metal arm and said center conductor plate, said contact between said at least one tuning screw and said at least one spring metal arm locking said at least one tuning screw into a set position.

20. An integrated radio unit comprising:

a base and a cover to house at least one functional unit and at least one filter unit wherein said at least one filter unit consists of a cavity and a center conductor plate, said cavity being formed by a combination of said base and said cover and the center conductor plate being situated within said cavity, and said combination simultaneously forming a protective housing for said at least one functional unit wherein further said at least one filter unit has a tuning device comprising at least one electrically conducting tuning screw inserted through said cover of said integrated radio unit and into said cavity; and a spring metal plate consisting of at least one electrically conducting spring metal arm extending into said cavity to contact said at least one tuning screw, said at least one filter unit being tuned by rotating said at least one tuning screw in said cavity for setting up an electrical capacitance between said center conductor plate and both of said at least one spring metal arm and said at least one tuning screw, said contact between said at least one tuning screw and said at least one spring metal arm locking said at least one tuning screw into a set position.

21. The integrated radio unit of claim 7, wherein the isolating material filling the cavity is ceramic.

* * * * *